United States Patent
Pittaway

(10) Patent No.: US 6,321,949 B1
(45) Date of Patent: Nov. 27, 2001

(54) MEASURE SYSTEM

(76) Inventor: Sheena Pittaway, 27 Delamere Road Hall Green, Birmingham B28 0EP (GB)

( * ) Notice: Subject to any disclaimer, the term of this patent is extended or adjusted under 35 U.S.C. 154(b) by 0 days.

(21) Appl. No.: 09/330,787

(22) Filed: Jun. 11, 1999

(30) Foreign Application Priority Data

Jun. 13, 1998 (GB) .................................................. 9812711

(51) Int. Cl.$^7$ .................................................. B67D 5/58
(52) U.S. Cl. .................... 222/189.02; 222/456; 222/565
(58) Field of Search .................... 222/189.02, 189.03, 222/189.06, 190, 454, 456, 565

(56) References Cited

U.S. PATENT DOCUMENTS

| | | | | |
|---|---|---|---|---|
| 2,568,526 | * | 9/1951 | Waring | 222/565 |
| 2,692,708 | * | 10/1954 | Frey | 222/456 |
| 4,106,672 | * | 8/1978 | Tecco et al. | 222/565 |
| 4,779,771 | | 10/1988 | Song | 222/456 |
| 5,542,579 | * | 8/1996 | Robbins, III | 222/456 |

FOREIGN PATENT DOCUMENTS

| | | |
|---|---|---|
| 484326 | 5/1938 | (GB) . |
| 1230154 | 4/1971 | (GB) . |

* cited by examiner

Primary Examiner—Joseph A. Kaufman
(74) Attorney, Agent, or Firm—Otho Ross

(57) ABSTRACT

An internal measuring and distribution system wherein a perforated platform 1 is elevated within a box or container allowing the granulated or analogous product within the box or container to filter through into a pre determined volume area 2 beneath the platform. The holes within the platform are angled and bevelled underneath to prevent the product seeping back through when the box is turned on its side as in FIG. 3, to dispense the product through the opening 3, thus alleviating the necessity to empty the product into a separate vessel in order to measure the recommended amount of product.

7 Claims, 1 Drawing Sheet

MEASURE SYSTEM

BACKGROUND OF THE INVENTION

The Inventor has identified a problem which commonly occurs to the consumer of boxes of washing powder, soda, rice and other granulated or analogous products, which is that, often a certain specified quantity is needed to be used in, for instance, the washing machine, or for a certain measured quantity of rice in cooking, and the consumer him or herself has to estimate the required quantity by tipping the box up which may result in spillage and over filling or under filling so far as the required amount is concerned.

The invention will alleviate the necessity to empty the product out of its container into another vessel as a way of measuring the required quantity, by means of an elevated perforated platform within the container accommodating the product thus avoiding incorrect measures, creating hygienic dispensing and avoids unnecessary use of additional equipment.

An embodiment of the invention will now be described with reference to the accompanying drawing in which:

DETAILED DESCRIPTION OF THE DRAWINGS

Figure 1:
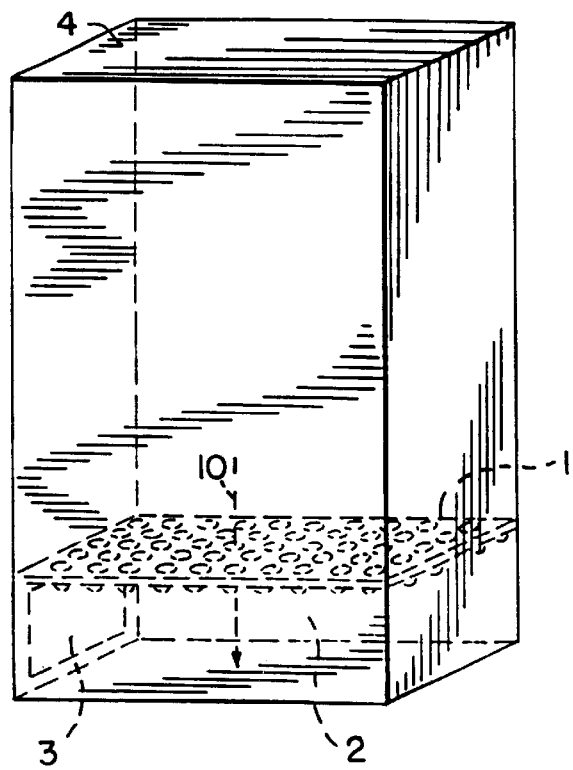
FIG. 1 shows a front view of the whole container with the platform elevated within.

FIG. 1 shows how the invention provides a separate specified compartment 2 at the bottom of the box or container 4 concerned, separated by a bridged elevated platform 1 perforated with numerous cavities 5 to allow a granulated or an analogous product to flow through 10.

As the invention has universal uses in its entirety, the weight of the supported product will determine whether the platform is bridged from below with the brace 6 spanning the width, as in FIG. 2, or alternatively spanning length A to B of the container. The platform 1 can also be suspended from above the platform. Again, the weight of the product determines the specific method of platform elevation.

Figure 2:
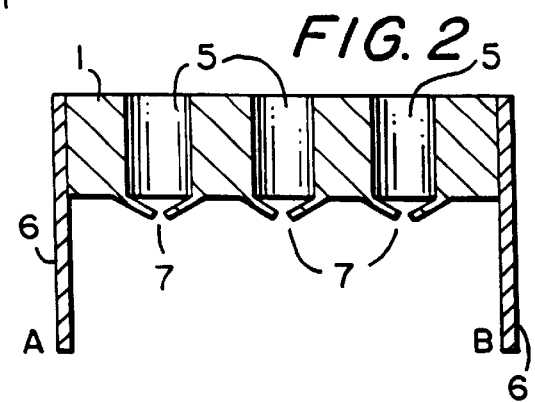
FIG. 2 shows a portion of a cross section of the platform
Figure 3:
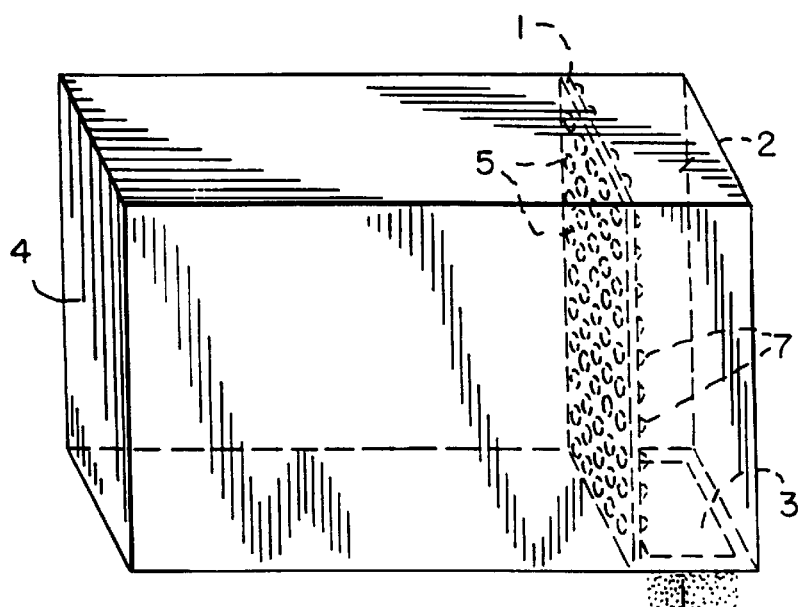
FIG. 3 shows the whole container as in FIG. 1 on its side dispensing the product

As in FIG. 2 The cavities underneath are angled and bevelled 7 to prevent the granulated product seeping back through the holes once the container is turned on its side to dispense the product 8, through the opening 3, as illustrated in FIG. 3. Gravity will pull the filtered product downwards 8 dispensing it through the opening 3 and not back through the bevelled angles 7 and cavities 5. The cavities 5 can vary in size in order to accommodate the relevant product. The angles 7 that are attached beneath the cavities 5 can also vary in degrees to accommodate the size of product filtered.

The area or volume beneath 2 the platform is pre determined to be the recommended quantity of product required. This is the area 2 from which the product is dispensed through the opening 3. The platform is erected within the container at the height required to maintain the pre determined volume of the area beneath the platform 1.

Once the product is dispensed from the separated compartment and the container is reduced to its standing position as shown in FIG. 1, the perforated platform 1 allows the nitration of the correct amount of product or repeat of the procedure to take place with the specified and required amount.

What is claimed is:

1. An internal measuring and distribution system comprising:

a container for holding a granular material;

a horizontal platform within the container extending to the inside edges of the container and elevated above the bottom of the container so as to define a predetermined volume beneath the platform, the platform further being perforated with a plurality of cavities to permit the filtration by gravity of a predetermined quantity of the granular material into the predetermined volume when the container is in an upright position;

each cavity being formed with angled bevels, for preventing the granular material from seeping back into the portion of the container above the platform when the container is tilted;

an opening with a moveable lid in a side of the container beneath the platform for dispensing the granular material when the container is tilted;

whereby, when the container is tilted by 90 degrees and the lid is then moved into an open position, the predetermined quantity of granular material is dispensed through the opening.

2. The internal measuring and distribution system of claim 1, wherein the bevels are attached to the platform and positioned beneath each cavity.

3. The internal measuring and distribution system of claim 2 wherein a bridge is provided to permit the elevation of the platform.

4. The internal measuring and distribution system of claim 1, wherein the bevels are positioned within and attached to the interior surface of each cavity.

5. The internal measuring and distribution system of claim 4 wherein a bridge is provided to permit the elevation of the platform.

6. The internal measuring and distribution system of claim 1, wherein each cavity is formed in the shape of a cone extending through the platform, in which the wide opening of each cone extends to the top surface of the platform, and the narrow opening of each cone extends to the underside surface of the platform, so as to form an angled interior surface of each cavity, for preventing the granular material from seeping back into the portion of the container above the platform when the container is tilted.

7. The internal measuring and distribution system of claim 6 wherein a bridge is provided to permit the elevation of the platform.

* * * * *